United States Patent [19]

Cargill et al.

[11] 4,381,075
[45] Apr. 26, 1983

[54] MICROPROCESSOR BASED CONTROLLER FOR HEATING SYSTEM

[75] Inventors: N. Allen Cargill, Warminister; Theodore M. Bunten, Fort Washington, both of Pa.

[73] Assignee: Thermonic Corp., Fort Washington, Pa.

[21] Appl. No.: 331,722

[22] Filed: Dec. 17, 1981

[51] Int. Cl.³ .............................................. F24D 3/00
[52] U.S. Cl. .................................. 237/8 R; 237/19; 236/70; 431/69; 236/9 R; 236/94; 236/46 R; 364/557
[58] Field of Search ............................ 237/8 R, 7, 19; 236/46 R, 47, 91 F, 70, 9 R, 9 A, 94; 165/22; 431/69; 364/557

[56] References Cited

U.S. PATENT DOCUMENTS

| 4,200,910 | 4/1980 | Hall ........................................ 165/22 |
| 4,290,551 | 9/1981 | Johnstone ............................... 236/9 |
| 4,300,199 | 11/1981 | Yoknis et al. ..................... 236/46 R |

FOREIGN PATENT DOCUMENTS 2019616 10/1979 United Kingdom ............. 236/91 F

OTHER PUBLICATIONS

American Stablis, Enertrol Instruction Manual, Jan. 1979.

Primary Examiner—Albert J. Makay
Assistant Examiner—Henry Bennett
Attorney, Agent, or Firm—Caesar, Rivise, Bernstein & Cohen, Ltd.

[57] ABSTRACT

An integrated, microprocessor-based primary control system for a building heating system. The control system includes in one unit a microprocessor and associated circuitry for (1) establishing the high limit of heat exchanger operation, (2) establishing the low-limit of heat exchanger operation for systems having a summer/winter coil, (3) modulating heat exchanger temperature as a function of outdoor temperature, (4) detecting alarm conditions, providing audio-visual signals while locking out heat exchanger operation in response thereto, and (5) providing an override time period for domestic hot water production in systems having a summer/winter coil.

14 Claims, 6 Drawing Figures

MICROPROCESSOR BASED CONTROLLER FOR HEATING SYSTEM

BACKGROUND OF THE INVENTION

This invention relates generally to building heating systems, and more particularly to control of heating systems.

As is known, in most building heating system applications, the heat exchanger (e.g., boiler or furnace), normally has excess reserve capacity to produce more heat into the heating fluid (water, if a boiler system; air, if a furnace system) than the system requires for heating the building. Accordingly, heating systems include "primary controls" which establish the maximum limit (called the "high limit") that the heat exchanger can run at before the control turns it off. Primary controllers work in cooperation with the building's thermostat(s), but override the thermostat if the high limit is attempted to be exceeded by a call for heat by the thermostat.

In typical heating systems when the thermostat determines that the building temperature has been achieved, the circulator (pump or fan, depending on the type of heating system) is turned off. Thus, the latent heat within the water or air is wasted. Such a loss is commonly referred to as a stand-by loss.

Add-on devices have been available for use in building heating systems to modulate the heat exchanger temperature as a function of the outdoor temperature. Such devices include an outdoor temperature sensor which is connected to the primary controller and to other portions of the heating system.

In U.S. Pat. No. 4,290,551 (Johnstone), there is disclosed an electronic controller for a heating system which includes means for modulating the boiler temperature in response to sensed outdoor temperature and for enabling the pump to circulate the heated water through the building even when the burner is off (providing that the water is above a predetermined temperature) to thus reduce stand-by loss. While the device of Johnstone appears generally suitable for its intended purposes, it does not include means for effecting various other control, display, warning and safety operations required for a fully integrated primary controller. Thus, many additional add-on devices are necessary for a complete system.

In heating systems having what is commonly referred to as a "summer/winter hookup" a domestic hot water coil is located within the boiler so that the domestic water flowing through the coil is heated by conduction from the boiler water. In such systems there must be some means provided to establish a low-limit for the boiler water temperature to insure that the domestic hot water is heated to the desired minimum level when the thermostat is not calling for heat. Since the temperature of the domestic hot water is typically desired in the range of 120°–150° F., the low-limit for boiler water temperature must be substantially higher, e.g., 150°–190° F. to effect sufficient heat transfer to the domestic hot water. Thus, in heating systems having a summer/winter hookup, devices must be provided for establishing the low-limit for the boiler. Such devices are frequently add-on units which must be physically incorporated into the heating system.

In systems utilizing a summer/winter hookup, add-on devices are available for providing a predetermined time period during which the burner is operated to produce domestic hot water in the event that there is no call for heat by the building's thermostat.

Heretofore, the most common type of primary control for a heating system has been an electromechanical control for sensing the heat exchanger temperature.

In such controllers used with either oil or gas-fired boilers, the boiler temperature sensing probe is in the form of a fluid-filled capillary tube. Such probes fail on occasion. Since the probe serves as the means for sensing if the boiler temperature is at the high-limit, the failure of the probe results in the controller calling for more heat (it thinks that the boiler temperature is too low), which action results in a runaway boiler, an obviously dangerous condition. Heretofore, prior art primary controllers have not provided sufficient means for preventing such runaway conditions.

In the interest of safety, and as required by Underwriters Laboratories, in oil-fired burner applications a flame detecting device is provided in the heating system to produce a signal indicative of the existence of a flame at the burner. The device is coupled to means for disabling ("locking-out") the burner in the event that a flame isn't sensed within a fixed period of time, e.g., 10 seconds after the building's thermostat calls for the burner to ignite. The most popular detecting device comprises a CdS cell located adjacent the burner head and electromechanical means coupled to the cell. The electromechanical means frequently comprises a bimetallic element which is heated to establish the time period during which flame ignition must occur. Due to the electromechanical construction of such flame sensing devices, the time constant established is not as precise as desired.

In gas-fired burner applications a CdS cell sensor is not necessary. In this regard, in such applications a thermocouple is normally included in the gas burner's pilot flame for providing a signal indicative of the presence of a pilot flame. The thermocouple is connected to means in the burner for precluding the main gas valve from opening in the event that the pilot flame is out.

Some display devices, e.g., meters, are available for displaying boiler temperature or other system conditions. However, such devices are merely add-on devices which must be physically incorporated into the system. Moreover, such display devices are not full-function displays for providing indications of various system conditions, e.g., CdS cell failure, primary probe failure, etc.

OBJECTS OF THE INVENTION

It is a general object of the instant invention to provide an integrated, primary controller for heating systems which overcomes the disadvantages of the prior art.

It is another object of the instant invention to provide an integrated, primary controller for use with various types of heating systems and which overcomes the disadvantages of the prior art.

It is a further object of the instant invention to provide an integrated, microprocessor-based, primary controller for providing in a single control system numerous operational and safety functions necessary for complete, safe and efficient control of a heating system.

It is still a further object of the instant invention to provide an integrated, microprocessor-based, primary controller for a heating system which provides the functions (1) establishing high-limit, (2) establishing low-limit (for summer/winter domestic hot water system), (3) providing heat exchanger temperature modulation as a function of outdoor temperature to reduce stand-by losses, (4) detecting of alarm conditions, e.g., probe or CdS cell failure, (5) providing safety lockout in the event of alarm conditions, (6) displaying alarm conditions and other system conditions, and (7) providing manual, as well as pre-programmed timed hot-water override periods in systems having a summer/winter water coil.

SUMMARY OF THE INVENTION

These and other objects of the instant invention are achieved by providing an integrated, primary safety and limit control system for building heating system, including a heat exchanger having a combustion side and a fluid side in which a fluid is heated, a gas or oil-fired fuel burner coupled to the combusion side for heating the fluid when the fuel is ignited, heat radiating means coupled to the heat exchanger and circulating means for transporting the fluid between the heat exchanger and the heat radiating means. The control system comprises adjustable thermostat means for establishing a desired temperature within the building, temperature sensing means responsive to heat exchanger fluid side temperature and outdoor temperature and microprocessor means responsive to said temperature sensing means and said thermostat means for providing control signals to the burner and said circulating means for controlling the operation thereof. The controller operates so that the fluid side temperature is modulated by the operation of the burner as a function of the fluid side temperature and outdoor temperature and the circulating means is enabled to operate (whether or not the burner is ignited) as a function of the fluid side temperature and outdoor temperature to attain the indoor temperature as established by the thermostatic means. Limit setting means are provided in the control system for establishing a predetermined maximum limit for the fluid side temperature. The microprocessor is responsive to the limit setting means for disabling the burner to prevent fuel ignition if the fluid side temperature would exceed the maximum limit and for enabling burner ignition, when called upon to do so by said microprocessor, if the fluid side temperature drops below a predetermined minimum limit.

This invention will be readily appreciated as the same becomes better understood by reference to the following detailed description when considered in connection with the accompanying drawing wherein:

DETAILED DESCRIPTION OF THE PREFERRED EMBODIMENT

Figure 1:
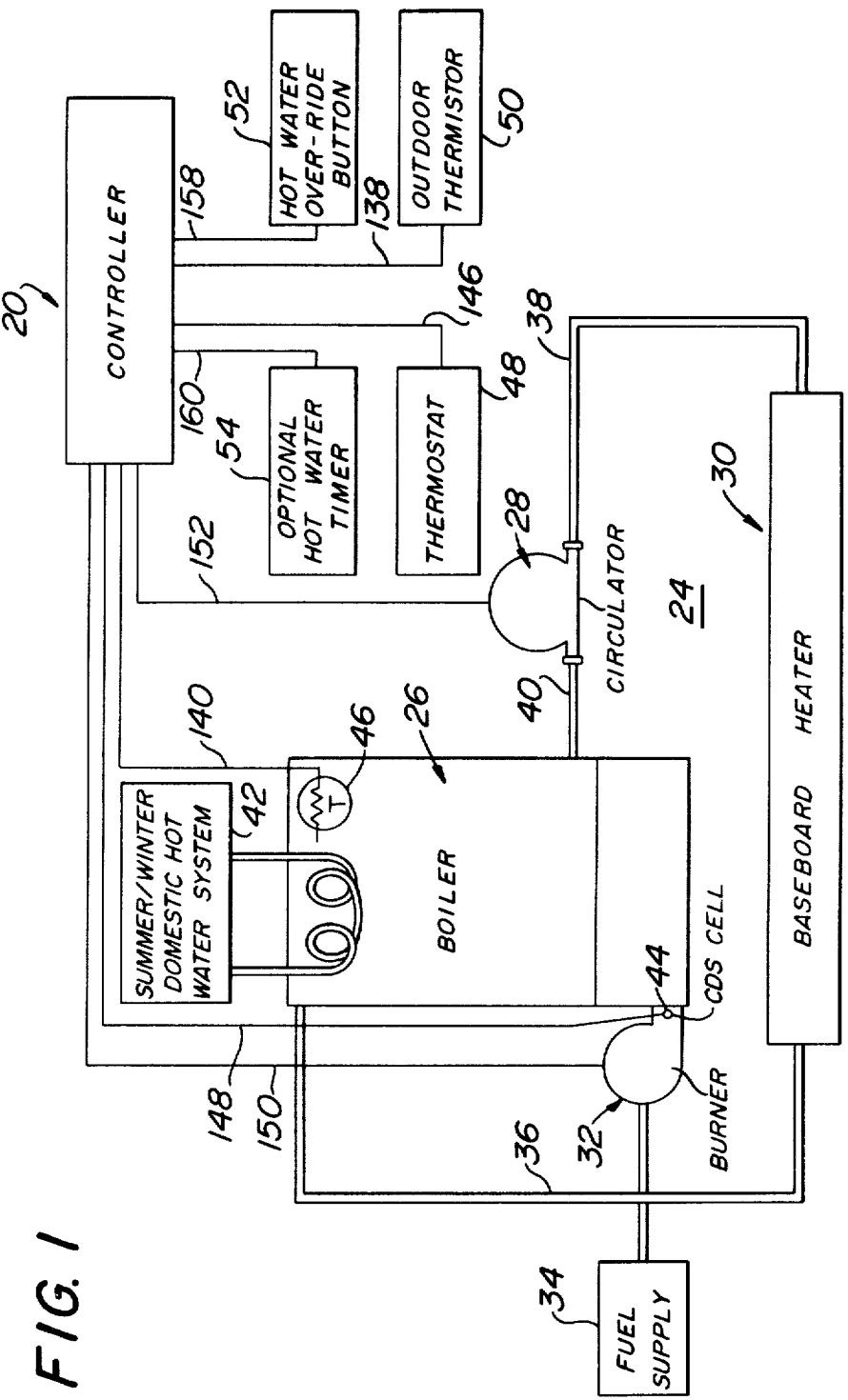
FIG. 1 is a schematic diagram of one type of conventional building heating system including the control system of the subject invention.

Referring now in greater detail to the various figures of the drawing wherein like reference characters refer to like parts, there is shown in FIG. 1 an integrated microprocessor-based, primary control system 20 for a building (e.g., residential) heating system 24.

The heating system 24 itself is conventional and basically comprises a heat exchanger, e.g., boiler 26, a circulator, e.g., pump 28, a baseboard heater 30, a burner 32 and a fuel supply 34. The boiler 26 includes a combustion side and a fluid, e.g., water, side. The burner 32 is located at the combustion side and is arranged to burn the fuel supplied by the fuel source 34 to heat the water in the boiler. The water heated by the boiler is circulated through a conduit 36, the baseboard heater 30, and through conduits 38 and 40 back to the boiler by the operation of the pump 28. Thus, upon operation of the pump, the boiler water is circulated through the system to effect the heating of the building.

It must be pointed out at this juncture that the control system of this invention can be utilized with either gas or oil-fired, boiler-based heating systems or with gas or oil-fired, furnace-based systems. In the embodiment shown in FIG. 1, the heating system is an oil-fired boiler system. In such a system, it is conventional practice to provide a Cadmium Sulphide (CdS) cell located adjacent the burner flame to sense the existence of the flame. The use of such a flame sensing detector is mandated by various building codes. In the embodiment shown in FIG. 1, the CdS cell is denoted by the reference numeral 44.

The control system 20 is also useful in boiler systems having what is commonly referred to as a summer/winter domestic hot water system. In such a system, a domestic water coil is located within the boiler tank so that the boiler water heats the water flowing through the coil to provide hot water for domestic purposes. The system 24 shown herein includes a domestic hot water system of the summer/winter type and denoted by the reference numeral 42.

Irrespective of the type of gas or oil-fired heating system, e.g., hot water (boiler) or air (furnace), thermostat means are commonly provided in the building to establish the desired indoor temperature. To that end, the thermostat is coupled to the fuel burner controller to initiate ignition of the burner in the event that the thermostat senses that the indoor temperature is lower than the desired temperature setting.

The control system 20 also makes use of the thermostat 48 for establishing the desired indoor temperatures, but, by virtue of its microprocessor and associated circuits, is also arranged to control the operation of the heating system 24 to modulate temperature as a function of sensed outdoor temperature. To that end, the system 20 includes an outdoor thermistor 50 for providing a signal indicative of the (ambient) temperature.

In either a gas or oil-fired boiler-based heating system, it is conventional practice to locate the primary temperature sensing probe within the boiler tank to provide a signal indicative of boiler temperature. The control system 20 makes use of a thermistor, shown schematically by the reference numeral 46, to serve as the primary temperature probe for the boiler.

Figure 2:
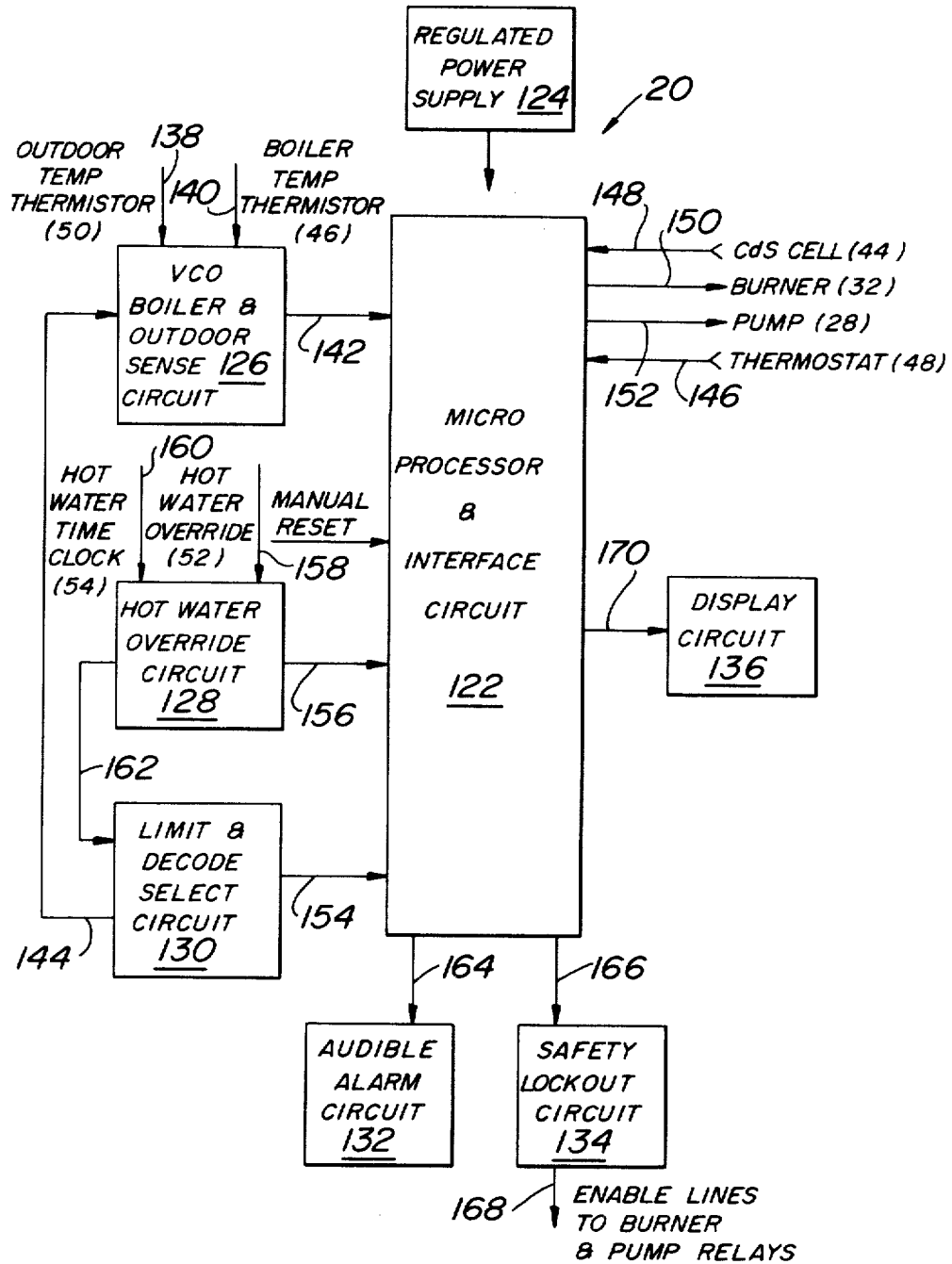
FIG. 2 is a schematic diagram of the control system shown in FIG. 1.

Referring now to FIG. 2, there is shown a functional block diagram of a controller forming the nucleus of the control system 20. The controller is a microprocessor based device which is arranged to provide overall control for the building's heating system 24. To that end, the controller provides the following operational features for the heating system. The controller also effects the on/off control of the heat exchanger's burner irrespective of the type of fuel used, e.g., gas or oil. The controller also effects the on/off control of the circulator 28 (pump or fan) to enable the circulator to continue to run with the burner off to improve heating system efficiency and energy savings and to provide intermittent circulation for compatibility with zone control and domestic coil boilers having a summer/winter hook-up. The controller also monitors the heat exchanger temperature to control the high limit, while monitoring the outdoor temperature to modulate the heat exchanger temperature in proportion of the heat required, thereby resulting in energy savings. In addition, the controller monitors or senses the existence of a flame in an oil fired burner system to insure ignition in the interest of safety and provides an automatic shut off and audio-visual alarm in the event of either a failure of the heat exchanger temperature probe (e.g., boiler thermistor), a failure of the CdS cell monitor or the detection of the failure of the burner to ignite within a predetermined time period. Further still, the controller provides a predetermined period of time, e.g., one hour, of hot-water override for domestic coil burners having a summer/winter hookup, in response to the manual actuation of a hot-water override button 52 or in response to clock signals provided automatically at predetermined times by a programmable timer 54.

The controller basically comprises a microprocessor and an interface circuit 122, a regulated power supply 124, a VCO boiler and outdoor sense circuit 126, a hot-water override circuit 128, a limit and decode select circuit 130, an audible alarm circuit 132, a safety lockout circuit 134 and a display circuit 136.

The VCO boiler and outdoor sense circuit 126 receives an input through line 138 from the outdoor thermistor 50 and a second input through line 140 from the boiler probe (thermistor) 46. The circuit 126 is arranged to provide a pulse train to the microprocessor and interface circuit 122, via line 142. The pulse train is proportional to the temperature sensed by either the outdoor thermistor 50 or the boiler temperature thermistor 46. The pulse train which is proportional to outdoor temperature and the pulse train which is proportional to boiler temperature are provided to the microprocessor under the control of the limit and decode select circuit 130. To that end, the limit and decode select circuit 130 has an output connected, via line 144, to the VCO boiler and outdoor sense circuit 126.

The microprocessor and interface circuit 122 is arranged to count the pulses provided from the boiler and outdoor sense circuit 126 and to convert the same into a real temperature to be used for display purposes and for calculating and maintaining the temperature which has been set by the thermostat 48. To that end, the thermostat 48 is connected, via line 146, to one input of the microprocessor and interface circuit 122. The CdS cell 44 is also connected to one input of the microprocessor and interface circuit 122, via line 148. One output of the microprocessor is provided on line 150 to the burner 32 and another output of the microprocessor is provided on line 152 to the pump 28. Lines 150 and 152 serve as the means for carrying the signals to initiate operation of the burner and pump, respectively, if their operation is not disabled by the operation of the safety lockout circuit 134, to be described later.

The limit and decode select circuit 130 establishes the high limit for the boiler water operating temperature for heating. If the boiler system includes a summer/winter coil, the limit and decode select circuitry 130 also establishes the low limit for boiler water operating temperature for domestic hot water production. Thus, the limit and decode select circuit 130 provides the binary coded decimal (BCD) signals, via line 154, to the microprocessor to establish decode settings for heating and domestic water.

The hot-water override circuit 128 is used in boiler based systems having a summer/winter domestic water hookup to provide an override signal on line 156 to the microprocessor and interface circuit 122. The override signal is used to establish a predetermined time period, e.g., one hour, during which the microprocessor controls the pump 28, while igniting the burner if the thermostat is not requesting the production of more heat and if the boiler water temperature, as sensed by the thermistor 46, is below the temperature, e.g., 160° F., set by the limit and decode select circuit for the production of domestic hot water. The override period can be established either manually or automatically in response to programmed signals from an auxiliary timer. The manual signal is produced by the depression of the hot-water override button and is coupled, via line 158, to the hot-water override circuit 128. The hot-water override button can consist of a single button 52 or a plurality of such buttons interconnected and located at various places in the building adjacent hot water taps or appliances to enable one to conveniently call for a hot-water override cycle, when desired. The timed override cycle can be established by a pre-programmed timer or clock 54. To that end, pre-programmed signals from a clock are provided, via line 160, to the hot-water override circuit 128.

Irrespective of whether the hot-water override circuit 128 receives signals from line 158 or line 160, it acts as a timer in response to receipt of those signals to provide the override signal, via line 156, to the microprocessor and interface circuit 122. Moreover, the hot-water override circuit provides a signal, via line 162, to the limit and decode select circuit 130 to indicate the existence of a hot-water override condition so that the limit and decode select circuit can provide the domestic water limit setting signals, via line 154, to the microprocessor 122.

The microprocessor is arranged to operate in response to the signals on lines 142 and 148 to provide signals to the audible alarm circuit 132 and the safety lockout circuit 134, via lines 164 and 166, respectively, indicative of a safety lockout condition. By safety lockout condition, it is meant that there was a detection of a failure of the primary temperature probe 46, or a failure of the CdS cell 44 or a failure of the burner to ignite after a predetermined period of time (such as caused by lack of fuel at the burner or for other reasons). The alarm circuit 132 provides a pulse setting alarm signal if there is an alarm condition. The safety lockout circuit 134 provides a lockout signal on lines 168. This lockout or "disable" signal is provided by lines 168 to the burner and pump relays to preclude operation of the burner and pump irrespective of whether or not the microprocessor is providing burner and pump operation initiate signals on lines 150 and 152, respectively.

The display circuit 136 is coupled to the microprocessor interface circuit, via lines 170, to provide a digital (seven segment), alpha/numeric display of boiler operating temperature as well as sytem operating conditions, e.g., probe failure, CdS cell failure, etc.

The regulated power supply 124 serves as the power supply for all of the circuitry making up the controller.

Figure 3A:
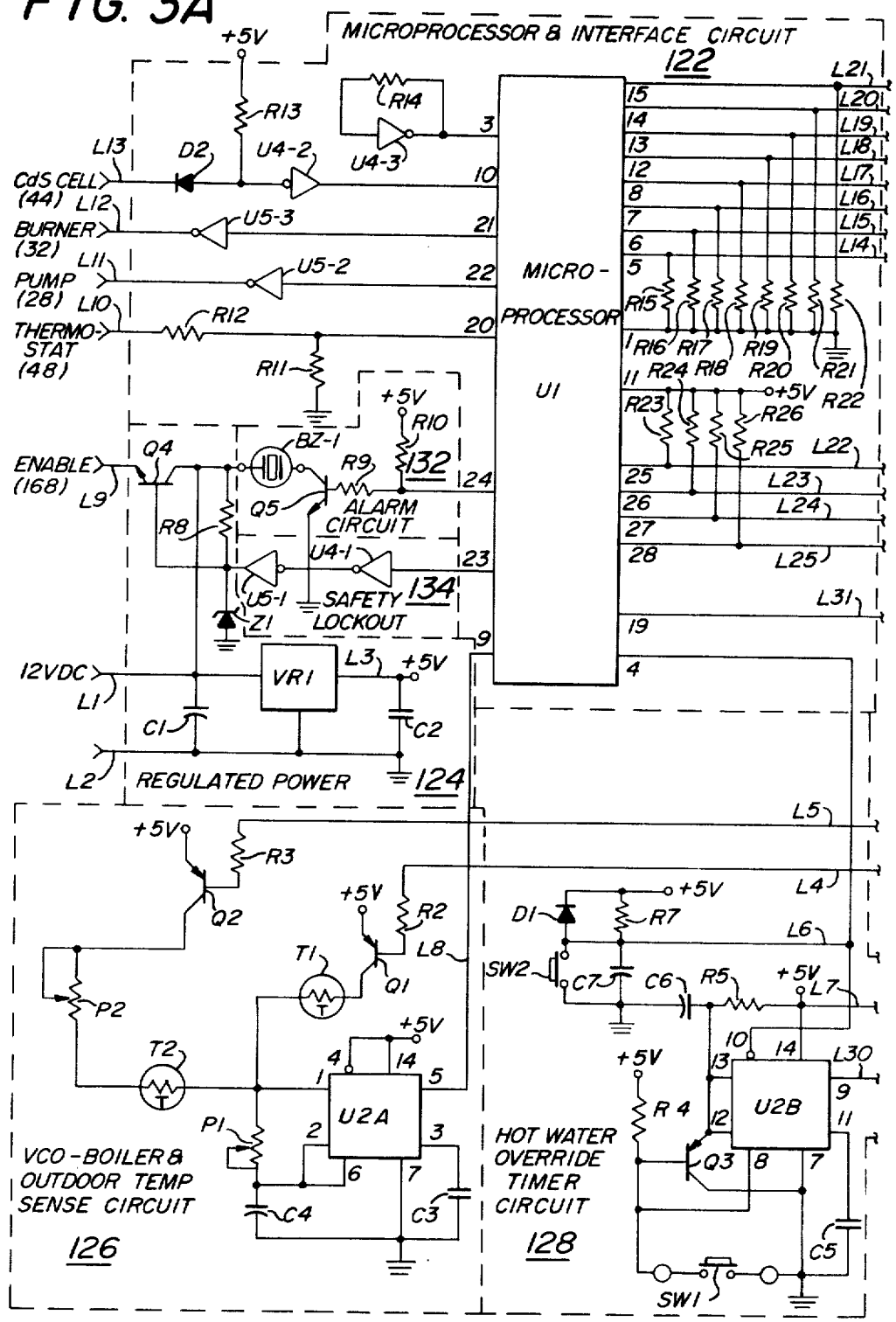
FIG. 3A is a schematic diagram showing a portion of the circuitry making up the controller shown in FIG. 2.
Figure 3B:
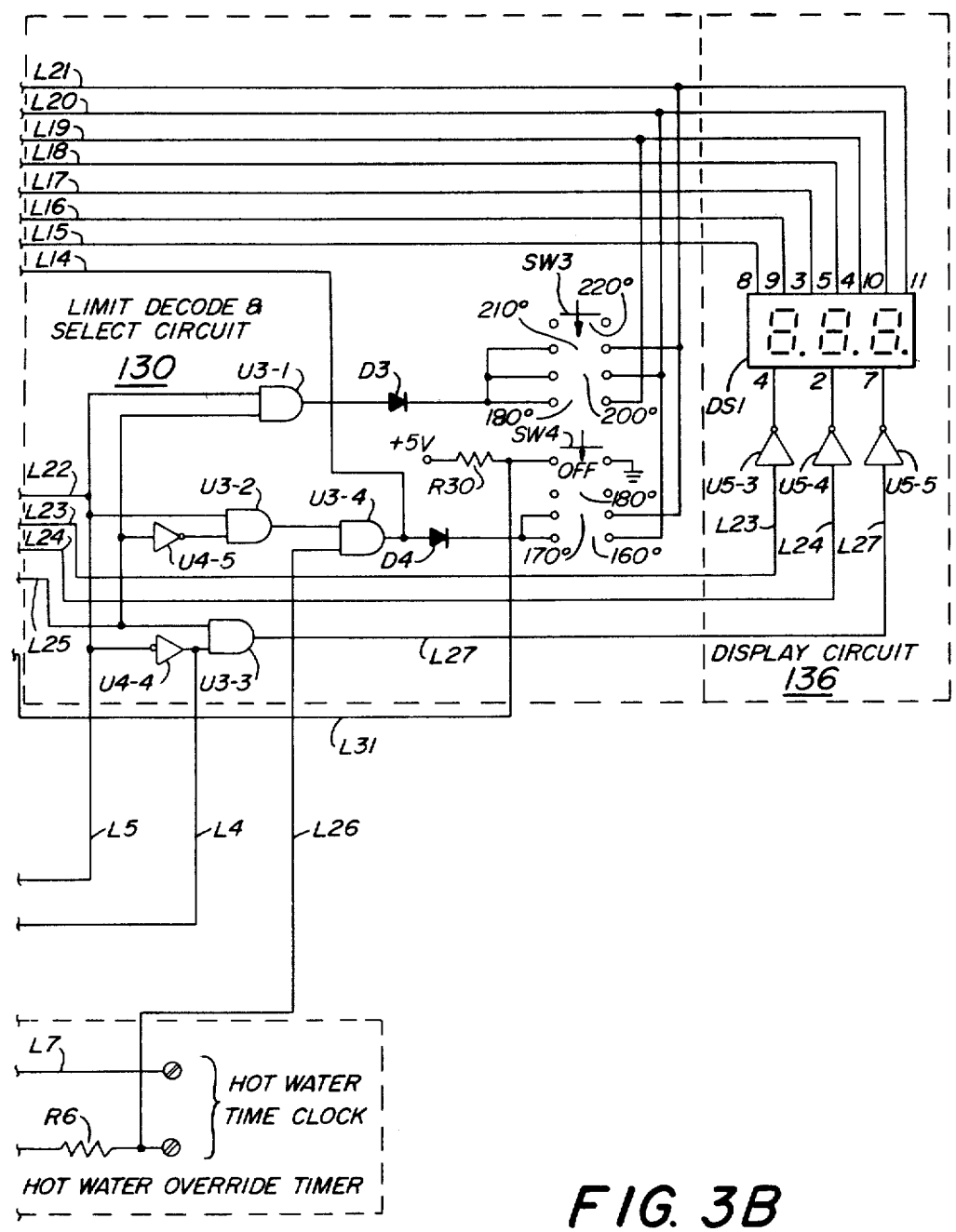
FIG. 3B is a schematic diagram showing the remaining portion of the circuitry making up the controller shown in FIG. 2.

Turning now to FIGS. 3A and 3B, the details of each of the circuits 122–136 will be discussed.

The power supply 124 serves to provide the operating components of the controller 24 with the +5 volts required for proper operation, the +12 volts for the burner and pump relays, and to provide the alarm circuit with +12 VDC (unregulated) for buzzer operation (to be described later).

As can be seen in FIG. 3A, the regulated power supply 124 basically comprises an integrated circuit regulator VRI, such as Model LM340T5, sold by National Semiconductor. A 12 volt DC unregulated voltage is provided, via line L1, to one input of the regulator VR1. One side of capacitor C1 is connected to line L1 and to ground line L2. The ground line L2 is also connected to the appropriate ground pin of VR1. One side of capacitor C2 is connected between the grounded line L2 and line L3. Line L3 is the regulated output line of VR1 and provide +5 volts bias to the electronic components making up the system 20. The power supply 124 also includes a transistor Q4 whose emitter is connected to line L9 which "enables" the pump and burner solenoids to initiate operation of the pump and burner when appropriate signals are provided by the microprocessor on lines 152 and 150, respectively. The base of transistor Q4 is connected to the common juncture of a resistor R8, the cathode of a zener diode Z1 and to the output of an integrated circuit driver U5-1 (of the safety lockout circuit 134), thereby providing a 12 volt series pass regulator.

The VCO boiler and outdoor sense circuit 126 basically comprises an astable timer, which in a commercial embodiment of this controller comprises one half of a 556 dual timer configured to operate in the astable mode. The timer is denoted by the reference numeral U2A. One commercially available type 556 dual timer suitable for this controller is sold by National Semiconductor as Model LM556CN. As can be seen, pin 7 of U2A is connected to ground and to one side of a capacitor C3 and one side of another capacitor C4. The other side of capacitor C3 is connected to pin 3 of U2A. The other side of capacitor C4 is connected to one side of a potentiometer P1 and its wiper arm and to the common juncture of pins 2 and 6 of U2A. The other side of the potentiometer P1 is connected to one side of a thermistor T2, to one side of a thermistor T1 and to pin 1 of U2A. Pins 4 and 14 of U2A are connected together to the +5 volt bias. Pin 5 of U2A is connected to line L8. The other side of thermistor T2 is connected to one side of a potentiometer P2. The other side of P2 and its wiper arm are connected to the collector of a transistor Q2. The other side of thermistor T1 is connected to the collector of a transistor Q1. The emmitter of transistor Q1 is connected to the +5 volt bias. The base of transistor Q1 is connected to one side of a resistor R2. The other side of resistor R2 is connected to Line L4. The emitter of transistor Q2 is connected to the +5 volt bias and the base of the transistor is connected to one side of a resistor R3. The other side of resistor R3 is connected to line L5. The thermistor T1 serves as the heretofore identified boiler temperature sensing probe 46. The thermistor T2 serves as the heretofore identified outdoor temperature sensor 50.

The capacitor C3 serves as a suppression capacitor and resistors R2 and R3 serve as interface elements for the driving transistors Q1 and Q2. The output signals from the oscillator U2A are provided, via line 8 to pin 9 of the microprocessor U1.

The operation of the VCO 126 is as follows: The half-timer element U2A operates as a timer in an astable mode, with the time constant of the oscillator frequency being established by the setting of either thermistor T1 or T2 and potentiometer P1. Selection of either thermistor T1 or T2 for establishing the oscillator frequency is accomplished under microprocessor control, via lines L4 and L5. To that end, when the oscillator frequency is to be established by the boiler water temperature as sensed by T1, an appropriate signal is provided on line L4 to render transmission Q1 conductive. In a similar manner, when the microprocessor provides an appropriate signal on line L5, transistor Q2 is rendered conductive, whereupon the frequency of oscillation produced by the oscillator U2A is a function of outdoor temperature as sensed by thermistor T2. The potentiometer P2 serves as a means for adjusting the system 20 to the efficiency of the building heating system 24. In this regard, some buildings can be heated more efficiently than others due to the heat dissipating or insulative properties of the building. The potentiometer P2 is coupled to means on the housing (not shown) of the controller to establish the desired efficiency setting for the building's heating system.

The hot-water override timer circuit 128 basically comprises the other half of the 556 dual timer, described heretofore with reference to circuit 126. This portion of the 556 dual timer is denoted by reference numeral U2B and operates in a monostable mode. Pin 7 of U2B is connected to ground and to one side of a manual push switch SW1 and to one side of a capacitor C5. The other side of capacitor C5 is connected to pin 11 of U2B. Pin 7 of U2B is also connected to the collector of a transistor Q3. The base of transistor Q3 is connected to the other side of switch SW1, to pin 8 of U2B and to one side of a resistor R4. The other side of resistor R4 is connected to the +5 volt bias. The emitter of transistor Q3 is connected to the common junction of pins 12 and 13 of U2B, one side of a resistor R5 and one side of capacitor C6. Pin 10 of U2B is connected to line L6. Pin 14 of U2B is connected to the other side of resistor R5, to the +5 volt bias and to a line L7. Line L7 is connected to one output terminal for an optional, programmable hot-water override clock shown schematically at 54 in FIG. 1. Pin 9 of U2B is connected, via line L30, to one side of a resistor R6. The other side of resistor R6 is connected to a line L26 and to the input terminal from the optional clock. The other side of capacitor C6 is connected to ground, to one side of a capacitor C7 and to one side of a push button switch SW2. The other side of capacitor C7 is connected to the other side of switch SW2, to the common junction of the anode of a diode D1, to one side of a resistor R7 and to line L6. The other side of resistor R7 and the cathode of diode D1 are connected together to the +5 volt bias. The switch SW1 serves as the heretofore identified hot-water override button 52, while the switch SW2 serves as a manual reset switch for the system.

The operation of the hot-water override timer circuit 128 is as follows: The other half of the 556 timer, that is circuit U2B, operates as a retriggerable, monostable, multivibrator having a one hour time constant which is established by resistor R5 and capacitor C6. Operation of the timer is initiated by the depression of manual override switch SW1. To that end, when SW1 is depressed, the monostable multivibrator U2B is rendered conductive, via the input signal at pin 8. In the event that SW1 is depressed during the time cycle, transistor Q3 is rendered conductive to discharge capacitor C7, whereupon a new one hour time cycle starts immediately. Thus, one can increase the length of the override cycle by depression of SW1 before U2B times out. Pin 9 of the monostable multi-vibrator U2B is coupled, via resistor R6 to line L26 as an input to the limit decode and select circuit 30 so that the microprocessor U1 is alerted when there is a request for hot water, i.e., switch SW1 is depressed.

The safety lockout circuit 134 basically comprises a driver U5-1 and a Schmitt Trigger U4-1. The driver U5-1 is a conventional driver, such as sold by National Semiconductor as Model DS8877N. The input to the driver U5-1 is connected from the output of a Schmitt Trigger U4-1. The Schmitt Trigger is a conventional device, such as sold by National Semiconductor, as Model MM74C14N. The input to the Schmitt Trigger U4-1 is connected from pin 23 of the microprocessor U1. The anode of zener diode is connected to ground. The collector of transistor Q4 is connected to line L1 and to the other side of resistor R8.

The safety lockout circuit 134 operates as follows: In the event of an alarm or lockout condition, a signal is provided at pin 23 of the microprocessor U1. The unregulated 12 volt DC is provided from the line L1 to the collector of transistor Q4. Absent a lockout condition, the output of U5-1 is high so that the transistor Q4 is conductive, thereby applying the regulated 12 volt DC to the line L9, which line is connected to the enable lines 168 of the burner and pump. Upon the occurrence of a lockout condition, the output of U5-1 goes low, whereupon the transistor Q4 of the supply circuit 124 ceases conducting, thereby disabling the enable lines 168 so that the relays of the pump and burner are disabled, whereupon operation of both the pump and burner are disabled irrespective of the signals being provided to the pump and burner, via lines 28 and 32, respectively. To reset the system after a lockout, the manual reset switch SW2 is depressed to provide a reset signal, via line L6, to the reset pin of the microprocessor. This resets the controller. The resistor R7 and capacitor C6 serve to automatically reset the microprocessor in the event of a momentary power failure.

The alarm circuit 132 basically comprises a transistor Q5, whose emitter is connected to ground. The collector of transistor Q5 is connected to one side of a buzzer BZ1. The buzzer is a conventional device, such as sold by Shogyo, as Model SL120. The other side of the buzzer BZ1 is connected to the unregulated 12 volt DC from L1. The base of transistor Q5 is connected to one side of a resistor R9. The other side of resistor R9 is connected to one side of another resistor R10 and to pin 24 of the microprocessor, to be described later. The other side of resistor R10 is connected to the +5 volt bias.

Operation of the alarm circuit 132 is as follows: Upon the existence of an alarm condition a high signal appears on pin 24 on the microprocessor U1, whereupon transistor Q5 is rendered conductive. This action causes the buzzer BZ1 to sound an audible alarm.

The microprocessor and interface circuit 122 basically comprises a microprocessor U1, such as a Model COP420N, sold by National Semiconductor, and various associated interface circuitry. To that end, pin 20 of the microprocessor U1 is connected to one side of a resistor R11 and to one side of another resistor R12. The other side of resistor R11 is connected to ground. The other side of resistor R12 is connected to line L10, which is connected to the thermostat 48. Pin 22 of the microprocessor U1 is connected to one side of a driver U5-2. Driver U5-2 is of the same type as driver U5-1. The output of driver U5-2 is connected to line L11, which is in turn connected to the pump relay 28. Pin 21 of the microprocessor U1 is connected to the input of a driver U5-3. The driver U5-3 is similar to drivers U5-2 and U5-1. The output of driver U5-3 is connected to L12, which is in turn connected to the burner relay 32. The input from the CdS cell 44 is provided, via line L13, to the cathode of a diode D2. The anode of diode D2 is connected to one side of a resistor R13 and to the input of a Schmitt Trigger U4-2. The Schmitt Trigger U4-2 is similar to Schmitt trigger U4-1, described heretofore. The output of the Schmitt Trigger U4-2 is connected to pin 10 of the microprocessor U1. The other side of resistor R13 is connected to the +5 volt bias. Pin 3 of the microprocessor U1 is connected to the common juncture of a resistor R14 and the output of a Schmitt Trigger U4-3. The Schmitt Trigger U4-3 is similar to Schmitt Triggers U4-2 and U4-1. The input of Schmitt Trigger U4-3 is connected to the other side of resistor R14. The output pins 5, 6, 7, 8, 12, 13, 14 and 15 of microprocessor U1 are connected to bus lines L14, L15, L16, L17, L18, L19, L20 and L21, respectively. Resistors R15, R16, R17, R18, R19, R20, R21 and R22 are connected between ground and lines L14, L15, L16, L17, L18, L19, L20 and L21, respectively. Pin 1 of the microprocessor is connected to ground. Pin 11 of the microprocessor is connected to the +5 volt bias and to one side of resistors R23, R24, R25 and R26. The other side of resistors, R23, R24, R25 and R26 are connected to bus lines L22, L23, L24 and L25, respectively. Pins 25, 26, 27 and 28 of microprocessor U1 are connected to lines L22, L23, L24 and L25, respectively. Pin 4 of the microprocessor is connected to line L6. Pin 9 of the microprocessor is connected to line L8. Pin 19 of the microprocessor is connected, via line L31, to one side of a low-limit switch SW4, to be described later.

The resistors R15 to R22 and resistors R23–R26 are connected to the bus lines and serve as pull up or pull down resistors to establish the basic binary states on the bus lines for the microprocessor. The integrated circuit U4-3 and its associated resistor R14 form the clock input for the microprocessor.

The input line L13 indicating the condition of the CdS cell is provided, via diode D2 and Schmitt Trigger U4-2 to input pin 10 of the microprocessor U1. The diode D2 provides no function in oil fired heating systems. However, when the controller of the instant invention is used in a gas fired system, i.e., one that does not utilize a CdS cell, lines L12 and L13 are bridged by a jumper strap so that the diode D2 simulates the operation of a working CdS cell. The Schmitt trigger U4-2 senses the signal from line L13 to provide an input signal indicating the operativeness of the CdS cell whenever the sensed level on line L13 is above or below the predetermined level of the Schmitt trigger. U5-3 serves as the driver for the burner relay, while driver U5-2 serves as the driver for the pump relay. The voltage input from the thermostat 48 provided on line L10 is divided by the voltage divider comprising resistors R11 and R12 to provide an appropriate level signal for input at pin 20 to the microprocessor.

Figure 4A:
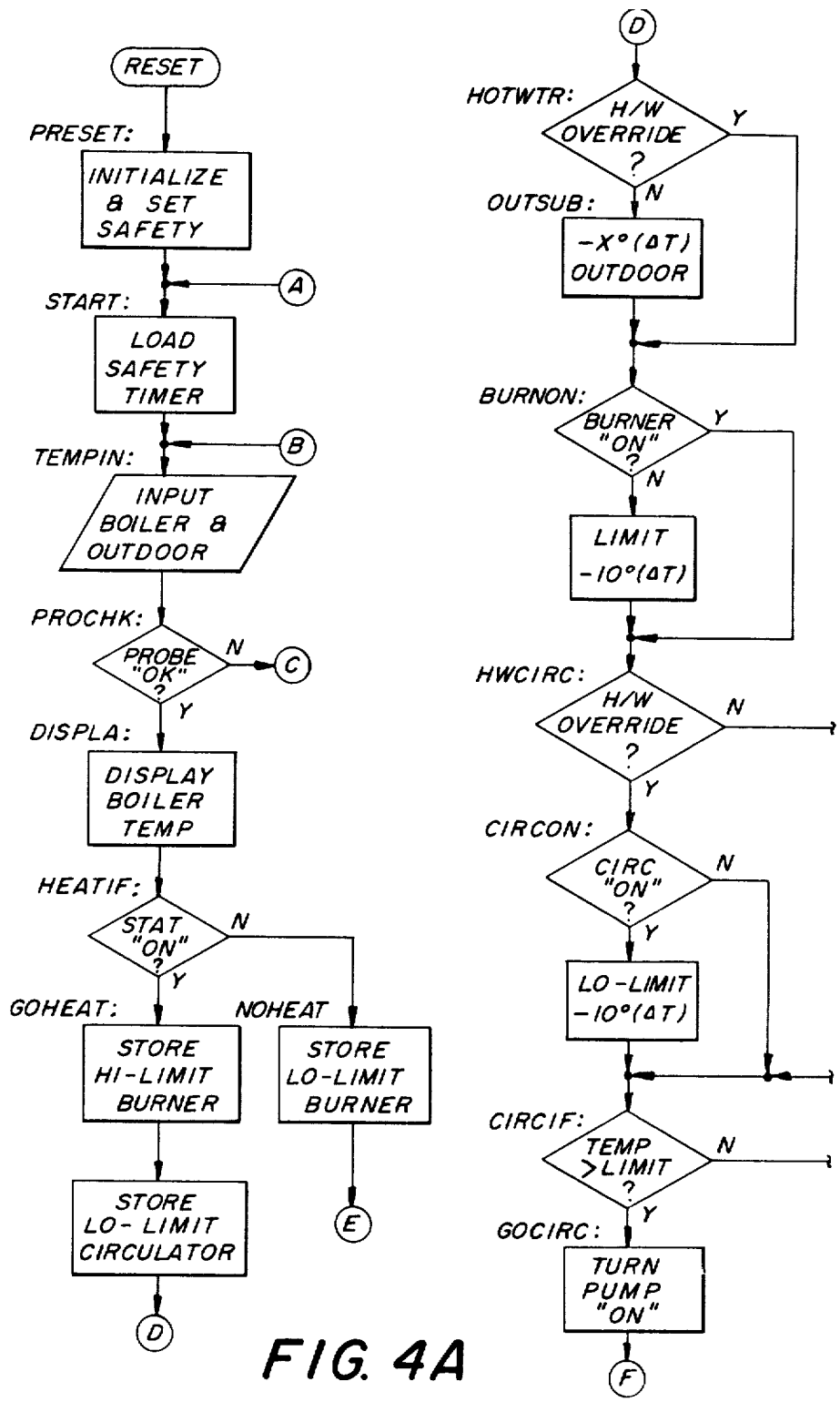
FIGS. 4A and 4B constitute respective portions of a flow chart showing the operation of the subject controller.
Figure 4B:
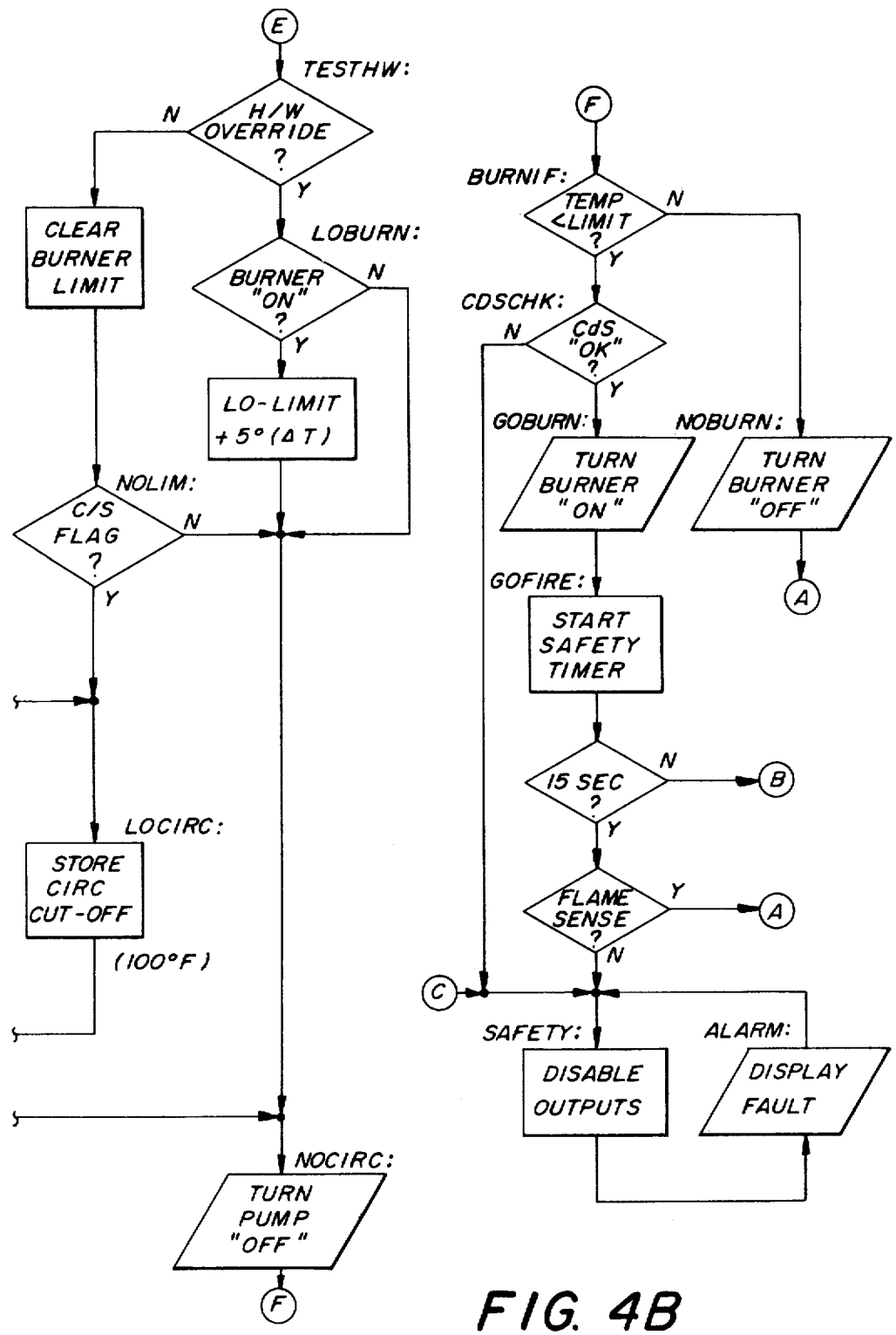

The operation of the microprocessor is set forth in the program listing attached hereto as Exhibit A and a flow chart of operation is provided in FIGS. 4A and 4B.

The limit decode and select circuitry is best seen in FIG. 3B. As can be seen, that circuitry basically comprises a Schmitt Trigger U4-4, whose input is connected to the common junction of lines L5 and L22, to one input of AND gate U3-1, and to one input of AND gate U3-2. The other input to AND gate U3-1 is connected to line L25, to the input of a Schmitt Trigger U4-5 and to one input of AND gate U3-3. The output of Schmitt Trigger U4-5 is connected as the other input to AND gate U3-2. The other input to AND gate U3-3 is connected to the output of Schmitt Trigger U4-4 and to line L4. The output of AND gate U3-1 is connected to the anode of a diode D3. The output of AND gate U3-2 is connected to one input of AND gate U3-4. The other input of AND gate U3-4 is connected to line L26. The output of AND gate U3-4 is connected to line L14 and to the anode of a diode D4. The output of AND gate U3-3 is connected to line L27. The cathode of diode D3 is connected to one side of a plural contact slide switch SW3. Switch SW3 establishes the "high limit" for the heat exchanger. The cathode of diode D4 is connected to one side of another plural contact slide switch SW4. The switch SW4 establishes the "low-limit", i.e., the domestic hot water limit, for systems including a summer/winter coil.

The operation of the limit decode and select circuit is as follows: Under the control of the microprocessor, the gates and inverters of the limit decode circuitry enable which of the two limit switches SW3 (high limit switch) and SW4 (low limit switch) are selected for inputting into the microprocessor, via lines L19, L20 or L21. Since the microprocessor bus lines are bidirectional, the diodes D3 and D4 serve as blocking diodes to prevent any signal present on the bus from backing up through gates U3-1 and U3-4, respectively.

The high limit switch SW3 comprises a movable (slider) contactor and four pairs of stationary contacts, any one of which pair can be bridged by the movement of the slider contact. The stationary contacts of SW3 are unnumbered but represent in order the high limit settings of 220° F., 210° F., 200° F. and 180° F. Thus, one contact of the pairs defining the temperatures 180°-210° F. is connected to the cathode of diode D3, while the corresponding contacts of each of said pairs is connected to bus lines L19, L20 and L21, respectively, to the microprocessor. In a similar manner, the SW4 comprises a slide switch having a sliding contactor and four pairs of contacts representing the temperatures 180° F., 170° F., 160° F. and OFF. One contact of the pairs defining the temperatures 160° and 170° are connected together to the cathode of diode D4, while the other contacts of those pairs are connected to bus lines L20 and L21, respectively. Thus, depending upon which of the switch contacts are bridged, the microprocessor is provided with data establishing the desired high limit and low-limit for the heating system. The slide switch Sw4 also includes another pair of contacts which define an OFF condition. One contact of that pair is connected to ground, while the other contact is connected to one side of a resistor R30. When the slider bridges the OFF contacts, the switch defeats opeation of the low-limit and forces constant circulation with thermostat 48 on or off down to a programmed cut-off temperature, i.e., 100° F.

The display circuit 136 basically comprises 7-segment, 3-digit display of conventional construction such as sold by National Semiconductor, as Model NSA0038. The display is denoted herein by reference numeral DS1. As can be seen, pins, 8, 9, 3,5, 4, 10 and 11 of DS1 are connected to bus lines L15, L16, L17, L18, L19, L20 and L21, respectively. Input pins 4, 2 and 7 of the display DS1 are connected to respective outputs of three drivers U5-3, U5-4 and U5-5, respectively. The inputs to drivers U5-3, U5-4 and U5-5 are connected to lines L23, L24 and L27, respectively.

The display circuit 136 operates to provide an indication of system conditions, e.g., boiler water temperature, probe failure, etc., depending upon which of the input lines to the display DS1 are enabled. For example, on a probe failure the display reads "PRO".

Overall operation of the device 20 can best be understood by reference to the flow charts of FIGS. 4A and 4B. In the program listing of Exhibit A, all of the steps of the program shown in the flow chart are identified. The label field of the program shown in the flow chart corresponds to the program sections shown in the program listing of Exhibit A. The program listing is in assembly language of National Semiconductors and identified as COP 400 series.

Referring now to FIGS. 4A and 4B, it can be seen that in the "PRESET" portion of the program, the initialization and safety setting is accomplished. Thereafter, the safety timer is loaded to establish the delay period after the occurrence of an alarm condition, e.g., CdS cell failure, and before a lockout occurs. During "TEMPIN" the boiler temperature and outdoor temperature, (offset) are inputted. During "PROCHK" the boiler thermistor 46 is checked. If the thermistor 46 has failed, then the "SAFETY" and "ALARM" portions of the program are carried out, whereupon the enable outputs to the pump and burner are disabled, thereby precluding the pump and burner from operating, and the alarm circuit is activated to produce the audible alarm. The display also provides a visual indication of the alarm condition at that time. If during "PROCHK" portion of the program the thermistor 46 is sensed as being functional, then the program moves to "DISPLA", whereupon the boiler water temperature is displayed by the display circuit.

Next, during the "HEATIF" portion of the program, the input from the thermostat 48 is checked by the microprocessor. If the thermostat is on, that is calling for heat, then the program proceeds to "GOHEAT", whereupon the high limit of the boiler and the low limit of the circulator, as defined by the limit switches, are stored in the microprocessor memory.

Next, the inputs to the microprocessor are checked to see if there is a request for hot-water override. This occurs during the portion of the program identified as "HOTWTR". If no request for hot-water override is detected, the microprocessor proceeds to the next portion of the program, identified as "OUTSUB". Herein, a temperature which is a function of the outdoor temperature is offset (subtracted) from the value established by the high limit switch. The temperature which is subtracted is also a function of the efficiency setting of potentiometer P2. Thus, one can adjust the potentiometer P2 to subtract X°F. for each 1° change in outdoor temperature to take into account the building's insulative properties. The program proceeds with "BURNON". In this regard, if a request for hot-water override is detected, the program skips the "OUTSUB" portion of the program and moves immediately to "BURNON". During the portion of the program identified as "BURNON", the burner is checked. If the burner is on, the program advances to the "HWCIRC" portion. If the burner is off, the program then proceeds to the portion of the program for preventing the burner from "short cycling". This portion is identified as "limit—10° F." and acts to prevent the burner from turning on until the boiler temperature has dropped 10° F. from the set limit (e.g., the setting of the limit switch or the modulated temperature setting from "OUTSUB"). Then the program advances to "HWCIRC".

During "HWCIRC", the inputs are again checked for a hot-water override, and herein, the mode of circulation is established for systems incorporating a domestic coil (summer/winter hook-up).

If the "HWCIRC" test is true, the program proceeds with "CIRCON". The portion of program "CIRCON" provides a similar −10° F. differential as described in "BURNON", for control of the pump to insure an adequate supply of domestic hot water, in systems so equipped, regardless of a thermostat call-for-heat. If no hot-water override is detected, the circulator low-limit is set at 100° F., via "LOCIRC", and the program advances to "CIRCIF".

During "CIRCIF", if the temperature is less than the limit established by "CIRCON" or "LOCIRC", the pump is turned off. If the temperature is greater than that limit, the pump is turned on.

The temperature of the boiler is then checked during the BURNIF portion of the program. If the temperature is equal to or greater than the preset limit, the burner is turned off and the program goes back to the "START" portion. If the temperature is less than the preselected limit, the program advances to the CDSCHK portion of the program during which the condition of the CdS cell is sensed. If the CdS is defective, the program advances to the SAFETY and ALARM portions of the program. During the SAFETY and ALARM portions, the outputs to the burner and pump relays, respectively, are disabled and the alarm circuit is initiated to provide an audible alarm of the lockout condition. At the same time the display provides a visual indication of the specific alarm condition.

If the condition of the CdS cell is good, the program advances to the GOBURN portion at which time the burner is turned on. The program then advances to the GOFIRE portion, wherein a safety timer (a portion of the microprocessor) is started. During the next 15 seconds the program returns to the TEMPIN portion during which the microprocessor is inputted with the boiler temperature and offset temperature. After 15 seconds have elapsed, the existence of a flame at the burner is checked. If a flame exists, then the program returns to the START portion wherein the safety timer is reloaded. If no flame is sensed, then the program advances to the SAFETY and ALARM portions, wherein the pump and burner enable outputs are disabled and the alarm and display circuit activated to provide an indication of the alarm condition.

During a previous portion of the explanation of the program shown in FIGS. 4A and 4B, operation was described for the condition wherein the thermostat is on (calling for heat) during the HEATIF portion of the program. The operation of the program will now be described for the condition in which the thermostat does not call for heat during the HEATIF portion. In such a condition, the program advances to the NO-HEAT portion wherein the microprocessor stores the low limit for hot water (assuming, of course, that the heating system includes a summer/winter coil so that there is a necessity for a low limit setting). The program then advances to the TESTHW portion.

During the TESTHW portion of the program, the hot-water override inputs are checked. If there is a call for hot water, via either the manual depression of the button 52 or a call from a programmed timer 54, the program advances to the LOBURN portion of the program, wherein the condition of the burner is checked. If the burner is on during the LOBURN portion, the "low-limit +5° F." function is accomplished. In LOBURN, the system is not calling for heat, but is calling for hot water. In such a case, the boiler temperature is raised above the low limit by 5° F. to maintain domestic hot water. The program then advances to the NOCIRC portion, wherein the pump is turned off. If there isn't a call for a hot-water override, the program clears the burner limit, then advances to the NOLIM portion, wherein the low-limit switch is checked for an off condition (no low-limit input). If the NOLIM test is true, the program advances to the LOCIRC portion and herein constant circulation is maintained down to 100° F. as defined by LOCIRC, irrespective of a thermostat call for heat. It is in this mode, that the greatest system efficiency is realized.

Operation then continues, via the CIRCIF, GOCIRC portions of the program to the BURNIF portion in the manner as described heretofore, that is the temperature is checked to see if below the pre-established limit and if so, the CdS cell is checked and the burner is turned on and the rest of the program proceeds as previously described. If the temperature sensed is greater than the limit, the burner is turned off and the program then returns to the START portion.

As will be appreciated from the foregoing, the control system of the instant invention provides maximum functionality by incorporating into one unit features of various add-on devices, while also providing unique monitoring, control and alarm features. All of this is accomplished by microprocessor-based circuitry, thereby insuring reliability, ease of operation and operational modification, via simple program modifications. Moreover, the control system provides wide utility in that it can be incorporated into various types of heating systems, e.g., gas or oil-fired boiler systems, gas or oil-fired furnace systems, systems having a summer/winter coil, systems having a gas, oil or electric hot water system, etc., with or without modifications (depending on heating system configuration).

Without further elaboration, the foregoing will so fully illustrate our invention that others may, by applying current or future knowledge, readily adapt the same for use under various conditions of service.

```
1           .TITLE COMCON, 'THERMONIC CONTROL'
2
3
4       ;THE FOLLOWING PROGRAM PROVIDES FOR A COMPLETE OPERATING
5       ;CONTROL SYSTEM INCLUDING ADJUSTABLE BOILER HI-LIMIT AND
6       ;DOMESTIC COIL LO-LIMIT SETTINGS, BURNER ON/OFF CONTROL,
7       ;CIRCULATOR RUN-ON CONTROL WITH AN AUTOMATIC TURN-OFF,
8       ;OUTDOOR SENSE TEMPERATURE MODULATION, THERMOSTAT AND CDS
9       ;CELL INPUTS, DIGITAL DISPLAY OF BOILER TEMPERATURE AND
10      ;FAULT CONDITIONS IN CONJUNCTION WITH AN AUDIBLE ALARM
11      ;INDICATOR AND A SAFETY LOCK-OUT REQUIRING MANUAL RESET.
12
13
14
15      PRESET: CLRA
16              XAD     0,7             ;SET FLAG FOR BOILER PROBE
17              OGI     4               ;INITIALIZE "G" PORT
18              LBI     1,12            ;CLEAR CDS FLAG
19              STII    0
20
21
22      START:  LBI     3,8             ;STORE FLAME SENSE TIME
23              STII    10
24
25
26      TEMPIN: LBI     0,7             ;TEST PROBE FLAG FOR WHICH
27              SKMBZ   0               ;  COUNTER TO ENABLE
28              LBI     2,13
29              LBI     2,9
30              STII    0               ;CLEAR COUNTER
31              STII    0
32              STII    0
33              LBI     0,7             ;TOGGLE FLAG
34              SKMBZ   0
35              JP      RESET
36              SMB     0               ;FLAG OUTDOOR PROBE
37              LBI     0,8
38              JP      SET
39      RESET:  RMB     0               ;FLAG BOILER PROBE
40              LBI     0,0
41      SET:    OGD                     ;OUTPUT FLAG
42              LBI     0,14            ;PRESET "TEMPIN" TIMER
43              STII    1
44              STII    3
45
46              LEI     2               ;ENABLE INTERRUPT
47
48      TIME:   SKT                     ;CLK ON INTERNAL TIMER
49              JP      TIME
50
51      COUNT:  LBI     0,14            ;INCREMENT THE TIMER
52              SC
53      BINADD: CLRA
54              ASC
55              NOP
56              XIS
57              JP      BINADD
58              SKC                     ;TIMING COMPLETE ?
59              JP      TIME            ;NO ! CONTINUE
60              LEI     0               ;YES ! DISABLE INTERRUPT
61
62              JSR     PRBCHK
63
```

```
64
65   HEATIF:  LBI     0,0              ;CLEAR "D" LATCHES
66            OBD
67            CLRA
68            ININ                     ;THERMOSTAT "ON" ?
69            AISC    8                ;YES !
70            JMP     NOHEAT           ;NO !
71
72
73   GOHEAT:  LBI     3,14             ;LOAD MAXIMUM HI-LIMIT
74            STII    2
75            STII    2
76            SC
77            JSR     HILIM            ;INPUT HI-LIMIT SWITCH
78
79            CLRA
80            AISC    1                ;INTER-STROBE DELAY
81            JP      .-1
82
83            LBI     3,10             ;LOAD MAXIMUM LO-LIMIT
84            STII    8
85            STII    1
86            RC
87            JSR     LOLIM            ;INPUT LO-LIMIT SWITCH
88
89
90   HOTWTR:  CLRA
91            LBI     3,0              ;HOT-WATER-OVERRIDE ?
92            SKE                      ;NO !
93            JP      BURNON           ;YES !
94
95
96   OUTSUB:  LBI     2,13             ;SUBTRACT OUTDOOR OFFSET
97            SC                       ;   FROM BURNER LIMIT
98            LD      1
99            CASC
100           ADT
101           XIS     1
102           JP      .-4
103
104
105  BURNON:  SKGBZ   0                ;BURNER "ON" ?
106           JP      HWCIRC           ;YES !
107           LBI     1,14             ;NO !
108           STII    1                ;STORE DIFFERENTIAL
109           STII    0
110
111  BCDSUB:  LBI     1,14             ;SUBTRACT DIFFERENTIAL
112           SC
113           LD      2
114           CASC
115           ADT
116           XIS     2
117           JP      .-4
118
119
120  HWCIRC:  CLRA
121           LBI     3,0              ;HOT-WATER-OVERRIDE ?
122           SKE                      ;NO !
123           JP      CIRCON           ;YES !
124
125
126  LOCIRC:  LBI     3,9              ;CIRCULATOR CUT-OFF LIMIT
```

```
127         STII    0
128         STII    0
129         STII    1
130         JP      CIRCIF
131
132
133 CIRCON: SKGBZ   1               ;CIRCULATOR "ON" ?
134         JP      .+2             ;YES !
135         JP      CIRCIF          ;NO !
136         LBI     1,10            ;STORE DIFFERENTIAL
137         STII    1
138         STII    0
139
140
141 LOSUB:  LBI     1,10            ;SUBTRACT DIFFERENTIAL
142         SC
143         LD      2
144         CASC
145         ADT
146         XIS     2
147         LD      2
148         CASC
149         ADT
150         X
151
152
153 CIRCIF: CLRA
154         RC
155         LDD     3,9             ;LOAD FIRST DIGIT
156         LBI     2,9             ;POINT TO INPUT
157         CASC                    ;COMP & ADD "A" TO INPUT
158         NOP
159         LDD     3,10            ;LOAD NEXT DIGIT
160         LBI     2,10            ;POINT TO INPUT
161         CASC                    ;COMP & ADD "A" TO INPUT
162         NOP
163         LDD     3,11            ;LOAD LAST DIGIT
164         LBI     2,11            ;POINT TO INPUT
165         CASC                    ;COMP & ADD "A" TO INPUT
166         JP      NOCIRC          ;INPUT < LIMIT
167
168
169 GOCIRC: SKGBZ   0               ;TEST FOR BURNER "OFF" ?
170         JP      .+4
171         OGI     6               ;YES ! CIRC "ON" / BURN "OFF"
172         JP      .+3
173         OGI     7               ;NO ! CIRC "ON" / BURN "ON"
174         JP      BURNIF
175
176
177 NOCIRC: SKGBZ   0               ;TEST FOR BURNER "OFF" ?
178         JP      .+4
179         OGI     4               ;YES ! CIRC "OFF" / BURN "OFF"
180         JP      .+3
181         OGI     5               ;NO ! CIRC "OFF" / BURN "ON"
182         JP      BURNIF
183
184
185 NOHEAT: LBI     3,14            ;LOAD MAXIMUM LO-LIMIT
186         STII    8
187         STII    1
188         SC
```

```
189           JSR      LOLIM            ; INPUT LO-LIMIT SWITCH
190
191
192   TESTHW  LBI      3, 0             ; HOT-WATER-OVERRIDE ?
193           CLRA
194           SKE
195           JP       LOBURN           ; YES !
196           LBI      3, 13            ; CLEAR BURNER LIMIT
197           STII     0
198           STII     0
199           STII     0
200           JMP      NOLIM
201
202
203   LOBURN: SKGBZ    0                ; BURNER "ON" ?
204           JP       .+2
205           JP       NOCIRC           ; NO !
206           LBI      3, 13            ; YES !
207           STII     5                ; STORE DIFFERENTIAL
208           JP       NOCIRC
209
210
211   BURNIF: CLRA
212           RC
213           LDD      2, 6             ; LOAD FIRST INPUT
214           LBI      3, 13            ; POINT TO LIMIT
215           CASC                      ; COMP & ADD "A" TO LIMIT
216           NOP
217           LDD      2, 7             ; LOAD NEXT INPUT
218           LBI      3, 14            ; POINT TO LIMIT
219           CASC                      ; COMP & ADD "A" TO LIMIT
220           NOP
221           LDD      2, 8             ; LOAD LAST INPUT
222           LBI      3, 15            ; POINT TO LIMIT
223           CASC                      ; COMP & ADD "A" TO LIMIT
224           JP       NOBURN           ; INPUT > LIMIT
225
226
227   CDSCHK: LBI      1, 12            ; CDS CELL "PROVE" CHECK
228           SKNBZ    0                ;   BEFORE BURNER ENABLE
229           JP       GOBURN
230           CLRA
231           ININ
232           JSR      CDS
233
234
235   GOBURN: SKGBZ    1                ; TEST FOR CIRCULATOR "OFF" ?
236           JP       .+4
237           OGI      5                ; YES ! BURN "ON" / CIRC "OFF"
238           JP       .+3
239           OGI      7                ; NO ! BURN "ON" / CIRC "ON"
240
241
242   GOFIRE: LBI      3, 3             ; FLAME SENSE TIMER
243           SC
244           CLRA
245           ASC
246           X
247           SKC
248           JMP      TEMPIN
249           CLRA                      ; TEST FLAME SENSE INPUT
250           ININ
251           XAD      3, 3
```

```
252           LBI     0,3
253           SKMBZ   2
254           JMP     START
255           JMP     NOFIRE
256
257
258  NOBURN:  SKMBZ   1           ;TEST FOR CIRCULATOR "OFF" ?
259           JP      .+4
260           OGI     4           ;YES ! BURN "OFF" / CIRC "OFF"
261           JP      .+3
262           OGI     6           ;NO ! BURN "OFF" / CIRC "ON"
263           LBI     1,12
264           STII    0
265
266           JMP     START       ;LOOP TO START
267
268
269           .=X'0FF              ;LOAD X'0FF WITH NOP
270  INTENT:  NOP                  ;   FOR INTERRUPT ENTRY
271
272           XAD     2,1         ;SAVE STATUS
273           CBA
274           XAD     2,2
275           XABR
276           SKC
277           AISC    8
278           XAD     2,3
279
280  INTRPT:  LBI     0,7         ;BCD ADD "TEMPIN"
281           SKMBZ   0
282           LBI     2,9         ;BOILER COUNTER MEMORY
283           LBI     2,13        ;OUTDOOR COUNTER MEMORY
284           SC
285           CLRA
286           AISC    6
287           ASC
288           ADT
289           XIS
290           CLRA
291           AISC    6
292           ASC
293           ADT
294           XIS
295           CLRA
296           AISC    6
297           ASC
298           ADT
299           X
300
301           LDD     2,9         ;STORE DUPLICATE "TEMPIN"
302           XAD     2,6
303           LDD     2,10
304           XAD     2,7
305           LDD     2,11
306           XAD     2,8
307
308           LDD     2,3         ;RESTORE STATUS
309           RC
310           AISC    8
311           SC
312           XABR
313           LDD     2,2
314           CAB
315           LDD     2,1
```

```
316
317            LBI     2                    ;RE-ENABLE INTERRUPT
318
319            RET                          ;CONTINUE "TIME"
320
321
322
323            .PAGE 5
324
325            .WORD 03F, 006, 05B, 04F, 066;  0-4
326            .WORD 06D, 07D, 007, 07F, 06F;  5-9
327            .WORD 071, 038, 077;  "FLA"
328            .WORD 073, 050, 05C;  "PRO"
329
330
331
332  PROCHK:   CLRA                         ;CHECK BOILER PROBE
333            LBI     2,10
334            SKE
335            JP      LIMIT
336            LBI     2,11
337            SKE
338            JP      LIMIT
339            JP      CTR
340
341  LIMIT:    SC
342            CLRA
343            AISC    6
344            LBI     2,10
345            CASC
346            NOP
347            CLRA
348            AISC    2
349            LBI     2,11
350            CASC
351            JMP     GOPRO
352
353  CTR:      LBI     1,0
354            SC
355            CLRA
356            ASC
357            X
358            SKMBZ   3
359            JP      NOPRO
360            JMP     DISPLA
361
362
363  NOPRO:    LBI     2,9                  ;PROBE CHECK ALARM OUTPUT
364            STII    15
365            STII    14                   ;LOAD WORD "PRO" INTO RAM
366            STII    13
367            JP      SAFETY
368
369
370  NOFIRE:   LBI     2,9                  ;NO FLAME ALARM OUTPUT
371            STII    12
372            STII    11                   ;LOAD WORD "FLA" INTO RAM
373            STII    10
374
375
376  SAFETY:   OGI     0                    ;DISABLE ALL OUTPUTS
377
378  ALARM:    JSR     DISPLA               ;DISPLAY ALARM CONDITION
379            SKMBZ   3
```

```
389          JP      SAFETY
390          OGI     8              ;ENABLE ALARM OUTPUT
391          JMP     ALARM
392
393
394  GOPRO:  LBI     1,0
395          STII    0
396
397
398  DISPLA: LBI     0,12           ;PRESET "DISPLA" TIMER
399          STII    13
400          STII    11
401
402  CLK:    SKT                    ;CLK ON INTERNAL TIMER
403          JP      .-1
404
405          CLRA                   ;BLANK THE DISPLAY
406          CAB
407          OBD
408
409          LBI     0,1            ;OUTPUT FIRST DIGIT
410          OBD
411          LBI     2,9            ;DIGIT 1 DATA LOCATION
412          CLRA
413          AISC    4              ;POINT TO TABLE PAGE
414          LQID                   ;LOAD SEGMENT CONVERSION
415          LEI     4              ;ENABLE SEGMENT OUTPUTS
416          SKT
417          JP      .-1
418          LEI     0              ;RESET SEGMENT OUTPUTS
419
420          LBI     0,2            ;OUTPUT NEXT DIGIT
421          OBD
422          LBI     2,10           ;DIGIT 2 DATA LOCATION
423          CLRA
424          AISC    4              ;POINT TO TABLE PAGE
425          LQID                   ;LOAD SEGMENT CONVERSION
426          LEI     4              ;ENABLE SEGMENT OUTPUTS
427          SKT
428          JP      .-1
429          LEI     0              ;RESET SEGMENT OUTPUTS
430
431          LBI     0,4            ;OUTPUT LAST DIGIT
432          OBD
433          LBI     2,11           ;DIGIT 3 DATA LOCATION
434          CLRA
435          AISC    4              ;POINT TO TABLE PAGE
436          LQID                   ;LOAD SEGMENT CONVERSION
437          LEI     4              ;ENABLE SEGMENT OUTPUTS
438          SKT
439          JMP     .-1
440          LEI     0              ;RESET SEGMENT OUTPUTS
441
442          CLRA                   ;BLANK THE DISPLAY
443          CAB
444          OBD
445
446          LBI     0,12           ;INCREMENT THE TIMER
447          SC
448          CLRA                   ;BINARY ADD "CLK"
449          ASC
450          NOP
451          XIS
452          CLRA
```

```
444          ASC
445          NOP
446          X
447          SKC
448          JMP     CLK
449
450          RET                     ; RETURN TO MAIN PROGRAM
451
452
453  NOLIM:  CLRA
454          ININ                    ; CIRCULATOR "RUN-ON" ?
455          XAD     2,0
456          LBI     2,0
457          SKMBZ   0
458          JMP     NOCIRC          ; NO !
459          JMP     LOCIRC          ; YES !
460
461
462  LOLIM:  LBI     0,8             ; STROBE LO-LIMIT
463
464  HILIM:  LBI     0,9             ; STROBE HI-LIMIT
465          OBD
466          SKC
467          LBI     3,9
468          LBI     3,13
469          STII    0
470          LBI     3,0             ; INPUT LIMIT SWITCH
471          INL
472          SKC
473          LBI     3,10
474          LBI     3,14
475          SC                      ; SUBTRACT SWITCH INPUT
476          CASC
477          ADT
478          XIS
479          CLRA
480          CASC
481          ADT
482          X
483          LBI     0,0             ; RESET STROBE
484          OBD
485
486          RET
487
488
489  CDS:    XAD     0,3
490          LBI     0,3
491          SKMBZ   2
492          JMP     NOFIRE
493          LBI     1,12
494          STII    1
495          RET
496
497          . END
```

I claim:

1. An integrated primary, safety and limit control device for a building heating system, said system including a heat exchanger having a combustion side and a fluid side in which a fluid is heated, a gas or oil fired fuel burner coupled to said combustion side for heating said fluid when said fuel is ignited, heat radiating means coupled to said heat exchanger, circulating means for transporting said fluid between said heat exchanger and said heat rediating means, adjustable thermostat means for establishing a desired temperature within said building, first sensor means for providing a signal indicative of heat exchanger fluid side temperature, second sensor means for providing a signal indicative of outdoor temperature, said device comprising, limit control means for establishing high and low temperature limits for said system, lockout means for selectively disabling said burner and said circulating means in response to a lockout signal, temperature sensing means responsive to said first and second sensor means for providing control signals indicative of outdoor temperature and fluid side temperature and for providing control signals indicative of a failure of said first sensor means, microprocessor means responsive to said temperature sensing means, said thermostat means and said limit control means for providing said lockout signal in response to said control signal indicative of a failure of said first sensor means and for providing signals to said burner and said circulating means for controlling the operation thereof, whereupon said fluid side temperature is modulated by the operation of said burner as a function of said fluid side temperature and outdoor temperature and said circulating means is enabled to operate whether or not said burner is ignited as a function of said fluid side temperature and outdoor temperature to attain the indoor temperature as established by said thermostatic means, said microprocessor being responsive to said limit control means for disabling said burner to prevent fuel ignition if said fluid side temperature would exceed said high temperature limit and for enabling burner ignition when called upon to do so if the fluid side temperature drops below said low temperature limit.

2. The integrated control device of claim 1 wherein said limit control means comprises first adjustable switch means for establishing said high temperature limit.

3. The integral control device of claim 1 additionally comprising means for producing an alarm signal in the event of a failure of said first sensor means.

4. The integral control device of claim 3 wherein said alarm is audible.

5. The integral control device of claim 3 additionally comprising display means for displaying a massage in the event of a failure of said first sensor means.

6. The integral control device of claim 1 additionally comprising display means for displaying heating system conditions.

7. The integral control device of claim 1 and wherein said heat exchanger comprises a boiler, said fluid comprises water, and said circulcating means comprises a pump, said heating system including a domestic hot water coil through which hot water for domestic use is passed, said coil being heated by the water in said boiler, said control device additionally comprising means for controlling said domestic hot water temperature in response to an external signal in the event that said boiler water temperature is below a predetermined threshold value.

8. The integral control system of claim 7 wherein said external signal is an override signal and wherein said last mentioned means comprises override means responsive to said override input signal, said microprocessor being responsive to said override means, whereupon said controller causes the burner to be ignited to raise the domestic water to a predetermined temperature for a predetermined override period of time.

9. The integral control system of claim 8 wherein said override signal is produced by manually operated means.

10. The integral control system of claim 8 wherein said override signals are produced by programmable clock means.

11. The integral control system of claim 8 wherein said pump is disabled if said boiler water temperature would result in the raising of the temperature of said building beyond its temperature set by the thermostat means during said override time period.

12. The integral control system of claim 1 wherein said heating system is oil fired and includes a light-detecting element for detecting the existence of a flame at said burner and for providing a signal indicative thereof, said microprocessor being responsive to said signal from said light-detecting means for producing said lockout signal in the event that said light-detecting means fails to provide said signal within a predetermined time after said burner is called upon to ignite by said microprocessor.

13. An integrated primary, safety limit and control device for a building heating system, said system including a heat exchanger having a combustion side and a fluid side in which a fluid is heated, a gas or oil fired fuel burner coupled to said combustion side for heating said fuel when said fuel is ignited, heat radiating means coupled to said heat exchanger, circulating means for transporting said fluid between said heat exchanger and said heat radiating means, first means for providing a signal indicative of outdoor temperature, second means for providing a signal indicative of heat exchanger fluid side temperature, and third means for providing a signal indicative of desired temperature within said building, said device comprising microprocessor means, heat exchanger and outdoor sense circuit means, limit decode and select means, and lockout circuit means, said limit decode and select circuit means providing high and low temperature limit control signals and decode signals, said high and low temperature limit control signals being coupled to said heat exchanger and outdoor sense circuit means, said decode signals being coupled to said microprocessor means, said heat exchanger and outdoor sense circuit means being coupled to said first and second means for providing control signals indicative of outdoor temperature and heat exchanger fluid side temperature in response to the signals provided by said first and second means and for providing control signals indicative of a failure of said second means, said control signals being coupled to said microprocessor means under the control of said decode signals from said limit decode and select circuit means, said microprocessor means being coupled to said third means for receipt of the signal indicative of desired temperature within said building, said microprocessor means providing first output signals coupled to said heat exchanger burner, second output signals coupled to said circulating means, and a lockout signal coupled to said lockout circuit means in the event of a failure of said second means, irrespective of whether or not said failure results in an open or closed circuit signal produced by said second means, said lockout circuit means for selectively disabling said burner and said circulating means in response to said lockout signal, whereupon if said burner and said circulating means are not disabled by said lockout means, said microprocessor means effects the modulation of said fluid side temperature by the operation of said burner as a function of said fluid side temperature and outdoor temperature and wherein said circulating means is enabled to operate whether or not said burner is ignited as a function of said fluid side temperature and outdoor temperature to attain the indoor temperature as established by said third means, said microprocessor operating in response to said decode signals and said control signals for disabling said burner to prevent fuel ignition if said fluid side temperature would exceed a maximum limit as established by said limit decode and select means and for enabling burner ignition if the fluid side temperature drops below a predetermined threshold temperature.

14. The integrated control system of claim 13 wherein said heating system is oil fired and includes a light-detecting element for detecting the existence of a flame at said burner and for providing a signal indicative thereof, said microprocessor being responsive to said signal from said light-detecting means for effecting the disabling of said burner and said circulating means producing said lockout signal in the event that said light-detecting means fails to provide said signal within a predetermined time after said burner is called upon to ignite by said microprocessor.

* * * * *